UNITED STATES PATENT OFFICE.

JOHN COLLINS CLANCY, OF NEW YORK, N. Y.

TREATMENT OF PRECIOUS METALLIFEROUS ORES.

976,043.      Specification of Letters Patent.      Patented Nov. 15, 1910.

No Drawing.      Application filed July 12, 1909. Serial No. 507,110.

*To all whom it may concern:*

Be it known that I, JOHN COLLINS CLANCY, a subject of the King of Great Britain, having declared my intention of becoming a citizen of the United States, at present residing at New York city, borough of Manhattan, in the county of New York and State of New York, have invented certain new and useful Improvements in the Treatment of Precious Metalliferous Ores, of which the following is a specification.

My invention relates to novel methods of treating ores bearing the precious metals, which methods are particularly described and pointed out in the following specification and claims.

I have discovered that when a substantially non-acid solution of a thiocyanate containing such ore is oxidized the precious metals only will be dissolved to the substantial exclusion of the baser metals. I have also discovered that ozone either alone or in admixture with air may be successfully employed as an agent for producing such oxidation. I have also discovered that said result may be accomplished by ozone with a solution of thiocyanate alone or in connection with cyanid. I have also discovered that this process may be successfully applied to either rebellious or nonrebellious ores without preliminarily roasting even though such ores contain reducing agents or tellurium or both.

I give the following examples of my process without, however, limiting myself to the details of either:

Example 1: 1,000 pounds of pulverized ore are suspended in a solution of one pound potassium thiocyanate and $\frac{1}{2}$ pound caustic lime or caustic soda in 2,000 pounds of water. 200 grams of ozone are thoroughly mixed with the solution. The ozone acts on the reducing agents (if any are present) and at the same time generates free cyanid from the thiocyanate which dissolves the precious metals and being in a substantially alkaline or neutral condition does not dissolve the baser metals.

Example 2: 1,000 pounds of pulverized ore are suspended in a solution of one pound potassium thiocyanate, $\frac{1}{2}$ pound potassium cyanid and $\frac{1}{2}$ pound caustic lime or caustic soda in 2,000 pounds of water. 200 grams of ozone are thoroughly mixed with the solution. The ozone acts on the reducing agents (if any are present) and at the same time generates free cyanid from the thiocyanate which dissolves the precious metals and being in a substantially nonacid condition (*i. e.* alkaline, neutral or slightly acid) does not substantially dissolve the baser metals. The precious metal solution obtained by each of the above examples is passed through the zinc shavings in the ordinary way to extract the values that it contains.

Although I have given a definite quantity of ozone in the above examples, I do not wish to be understood that either this or the other quantities given are invariable. The proper amount of ozone may be determined by titration or otherwise and with some ores as little as 15 grams of ozone to 2,000 pounds of solution have given good results.

In each of the above examples, the ozone may be either alone or mixed with air.

In each of the above examples, the desired result is prevented if the solution be substantially acid. Where cyanid is absent, as in the first example, the solution should be alkaline or neutral. Where cyanid is present, as in the second example, the solution may be alkaline, neutral or slightly acid. By slightly acid, I mean this: that while a solution of potassium cyanid may be technically termed "slightly acid" because showing acidity to certain tests, yet for practical purposes it is substantially not acid. Such a solution I call a substantially non-acid solution as well as those which are alkaline or neutral.

The strength of the solution is to some extent dependent upon the character of the ore to be treated and the best strength should therefore be ascertained by preliminary tests, but with ordinary ores the strength that I have given in the foregoing examples answers well. The same solution can be used again and again by keeping up the requisite strength of its constituents.

It is not necessary to preliminarily roast the ore. If reducing agents, such as sulfids of iron are present, they do not act on the solution to decompose it. If tellurium is present, it is dissolved simultaneously with the precious metals.

Having thus described my invention and examples of different ways of carrying it into effect, it will be understood that various modifications and changes in the described processes may be made and equivalent sub- stances may be employed without departing from the spirit of my invention and without exceeding the scope of my claims.

What I claim is:

1. The method of treating ore containing precious metals which consists in oxidizing a substantially nonacid solution containing thiocyanate and said ore.

2. The method of treating ore containing precious metals which consists in oxidizing a solution containing thiocyanate and the ore by means of ozone.

3. The method of treating ore containing precious metals which consists in oxidizing a substantially nonacid solution containing a thiocyanate and a cyanid containing said ore.

4. The method of treating ore containing precious metals which consists in oxidizing a solution containing a thiocyanate and a cyanid containing said ore by means of ozone.

In testimony whereof, I have hereunto signed my name in the presence of two subscribing witnesses.

JOHN COLLINS CLANCY.

Witnesses:
  A. B. AHRENS,
  M. E. McNINCH.